United States Patent
Zhang

(10) Patent No.: US 12,134,364 B2
(45) Date of Patent: Nov. 5, 2024

(54) SAFETY BELT CONNECTING STRUCTURE AND CHILD SAFETY SEAT

(71) Applicant: WONDERLAND SWITZERLAND AG, Steinhausen (CH)

(72) Inventor: Daliang Zhang, Guangdong (CN)

(73) Assignee: WONDERLAND SWITZERLAND AG, Steinhausen (CH)

(*) Notice: Subject to any disclaimer, the term of this patent is extended or adjusted under 35 U.S.C. 154(b) by 0 days.

(21) Appl. No.: 17/865,073

(22) Filed: Jul. 14, 2022

(65) Prior Publication Data

US 2023/0018910 A1 Jan. 19, 2023

(30) Foreign Application Priority Data

Jul. 15, 2021 (CN) .......................... 202110801857.3

(51) Int. Cl.
*B60R 22/02* (2006.01)

(52) U.S. Cl.
CPC ................................. *B60R 22/024* (2013.01)

(58) Field of Classification Search
CPC ... B60R 22/105; B60R 22/024; B60N 2/2812; B60N 2002/2815; B60N 2/2806; B60N 2002/2818
USPC ............................................... 280/808, 801.1
See application file for complete search history.

(56) References Cited

U.S. PATENT DOCUMENTS

| | | | | |
|---|---|---|---|---|
| 5,074,588 A | * | 12/1991 | Huspen | B60R 22/105 D29/101.1 |
| 5,468,020 A | * | 11/1995 | Scime | B60N 2/2866 280/808 |
| 6,364,417 B1 | * | 4/2002 | Silverman | B60R 22/105 297/484 |

(Continued)

FOREIGN PATENT DOCUMENTS

| CN | 104627117 B | 2/2018 |
|---|---|---|
| CN | 207311196 U | 5/2018 |

(Continued)

OTHER PUBLICATIONS

Hou, CN 211543317 U English Translation and Original document, retrieved on Dec. 30, 2022 (Year: 2019).*

(Continued)

*Primary Examiner* — Drew J Brown
*Assistant Examiner* — Caitlin Anne Miller
(74) *Attorney, Agent, or Firm* — HAUPTMAN HAM, LLP

(57) ABSTRACT

A safety belt connecting structure includes first and second shoulder belts, and an adjusting belt. The first and second shoulder belts have corresponding first and second shoulder belt coupling ends and first and second shoulder belt connecting end, and the first shoulder belt engaging end is coupled to a facility where the safety belt connecting structure is installed. The second shoulder belt coupling end is coupled to the facility. The adjusting belt has an adjusting belt connecting end and an adjusting belt adjusting end. The adjusting belt connecting end is connected with the first and (Continued)

second shoulder belt connecting ends, and the adjusting belt adjusting end is adjustably fixed with a positioning portion on the facility, so that an acting length of the safety belt connecting structure with respect to the facility is adjustable by adjusting a position of the adjusting belt with respect to the positioning portion.

17 Claims, 16 Drawing Sheets

(56) References Cited

U.S. PATENT DOCUMENTS

| | | | |
|---|---|---|---|
| 6,471,298 B2* | 10/2002 | Carine | B60N 2/286 |
| | | | 297/483 |
| 6,547,334 B1* | 4/2003 | Girardin | B60R 22/105 |
| | | | 297/484 |
| 7,481,399 B2* | 1/2009 | Nohren | B60R 22/415 |
| | | | 244/122 R |
| 8,777,323 B2* | 7/2014 | Merrill | B60R 22/14 |
| | | | 297/483 |
| 9,487,110 B2* | 11/2016 | Cohen | B60N 2/2887 |
| 9,610,866 B2* | 4/2017 | Mitsuo | B60N 2/28 |
| 10,259,357 B2* | 4/2019 | Dingman | B60N 2/286 |
| 10,266,077 B2* | 4/2019 | Mason | B60N 2/28 |
| 2004/0169411 A1* | 9/2004 | Murray | B60R 22/105 |
| | | | 280/801.1 |
| 2012/0112444 A1* | 5/2012 | Nishino | B62J 27/10 |
| | | | 280/808 |
| 2013/0249204 A1* | 9/2013 | Fink | B60R 22/024 |
| | | | 280/801.1 |
| 2016/0023579 A1 | 1/2016 | Balensiefer, II et al. | |
| 2022/0118888 A1* | 4/2022 | Wu | A44B 11/04 |

FOREIGN PATENT DOCUMENTS

| | | | |
|---|---|---|---|
| CN | 108068670 B | 3/2020 | |
| CN | 211543317 U * | 9/2020 | B60N 2/2803 |
| DE | 102013214268 A1 | 2/2014 | |
| EP | 1681961 B1 | 2/2011 | |
| WO | 8602050 | 4/1986 | |
| WO | 2021114706 A1 | 6/2021 | |

OTHER PUBLICATIONS

Taiwan 1st Office Action issued in corresponding Taiwan Application No. 111126261, dated May 4, 2023, pp. 1-10.
German 1st Office Action issued in corresponding German Application No. 102022117423.9, dated Jul. 24, 2023, pp. 1-6.

* cited by examiner

SAFETY BELT CONNECTING STRUCTURE AND CHILD SAFETY SEAT

TECHNICAL FIELD

The present disclosure relates to a safety belt connecting structure, and a child safety seat with the safety belt connecting structure.

BACKGROUND

Riding devices, such as child safety seats and carry cots, are common devices for children of different ages to seat or be placed thereon. Child safety seats are designed for the riding safety of children, which can restrain their potentially dangerous behavior in the vehicle during driving, and protect them from being hurt in the event of a sudden collision or if other car accidents occur.

Special child safety belts are used in the child safety seats to restrain and secure the child. A commonly used child safety belt is arranged in such a way that a shoulder belt, a waist belt and a crotch belt are provided at the front of the child safety seat, and the shoulder belt is connected with the waist belt and the crotch belt through a corresponding buckle, and the shoulder belt extends above the child safety seat to the rear side of the seat. An adjusting belt is provided at the rear side of the child safety seat. The adjusting belt has an end connected with the shoulder belt at the rear of the seat, and the other end extending out from the front side under the seat by passing through the rear and bottom of the child safety seat, so that the user can adjust a service length of the shoulder belt of the safety belt. With this arrangement, if the shoulder belt and the adjusting belt at the back of the seat are connected in a stretchable or extensible way, the child safety belt will be stretched or extended to change the length thereof or be deformed when the child in the seat is impacted, so that the expected protective effect of the safety belt may not be achieved. Therefore, it is necessary to provide an improved connection between the shoulder belt and the adjusting belt, in which stretching or extending are not allowed at the connection, ensuring protective capability of the safety belt to a greater extent.

SUMMARY

The present disclosure provides a safety belt connecting structure including a first shoulder belt, a second shoulder belt, and an adjusting belt. The first shoulder belt has a first shoulder belt coupling end and a first shoulder belt connecting end, and the first shoulder belt engaging end is coupled to a facility where the safety belt connecting structure is to be installed. The second shoulder belt has a second shoulder belt coupling end and a second shoulder belt connecting end, and the second shoulder belt coupling end is coupled to the facility. The adjusting belt has an adjusting belt connecting end and an adjusting belt adjusting end. The adjusting belt connecting end is fixedly connected with the first shoulder belt connecting end and the second shoulder belt connecting end, and the adjusting belt adjusting end is adjustably fixed with a positioning portion on the facility, so that an acting length of the safety belt connecting structure with respect to the facility can be adjusted by adjusting a position of the adjusting belt with respect to the positioning portion.

The present disclosure provides a child safety seat including a seat body, a safety protective portion and the safety belt connecting structure according to the present disclosure. The safety protective portion is located at the front of the seat body and configured to fix a passenger on the seat. The safety belt connecting structure is installed on the back of the seat body. A lower end of the safety protective portion is coupled to the seat body, and an upper end of the safety protective portion is connected to the first shoulder belt coupling end and the second shoulder belt coupling end of the safety belt connecting structure through a corresponding hole on the back of the seat body, and the adjusting belt adjusting end of the safety belt connecting structure is coupled to the seat body.

BRIEF DESCRIPTION OF THE DRAWINGS

Embodiments of the present disclosure will be described in detail below with reference to the accompanying drawings, in which.

DETAILED DESCRIPTION

Figure 1:
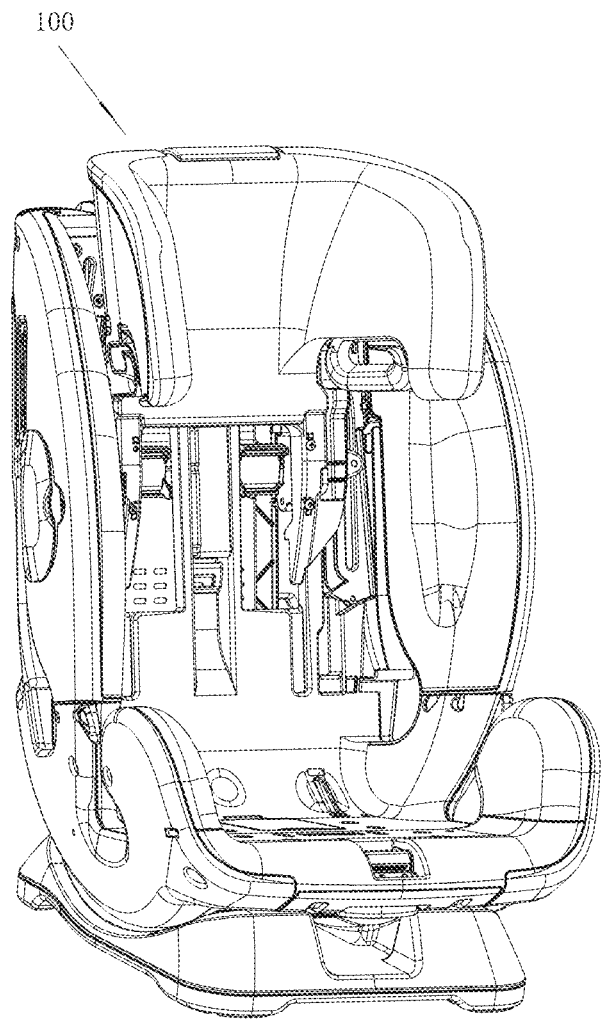
FIG. 1 is a perspective view of a child safety seat according to the present disclosure, in which a child safety belt is not shown.
Figure 2:
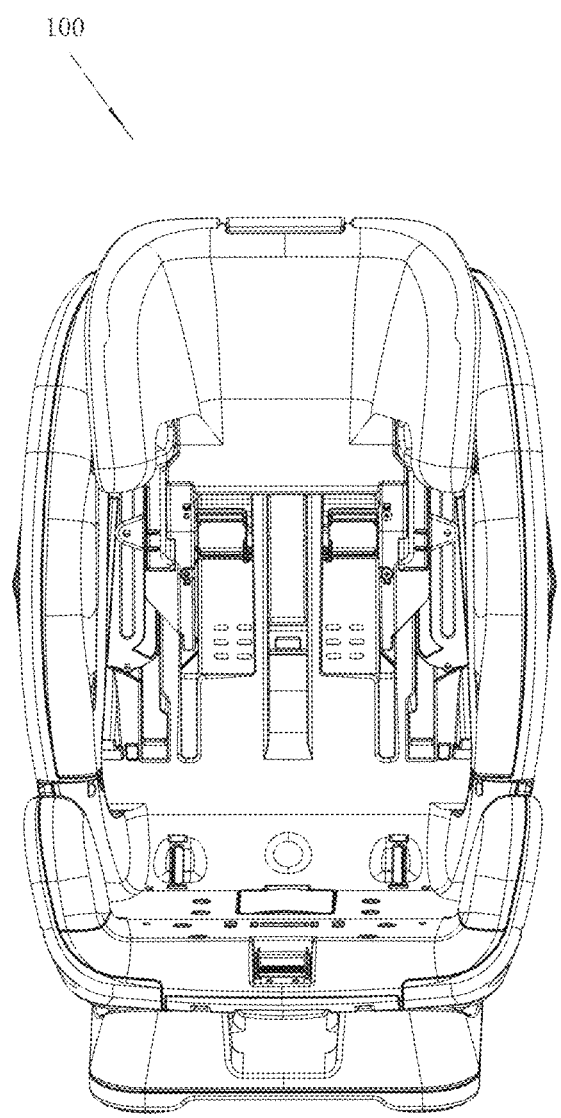
FIG. 2 is a front view of the child safety seat according to the present disclosure, in which the child safety belt is not shown.
Figure 3:
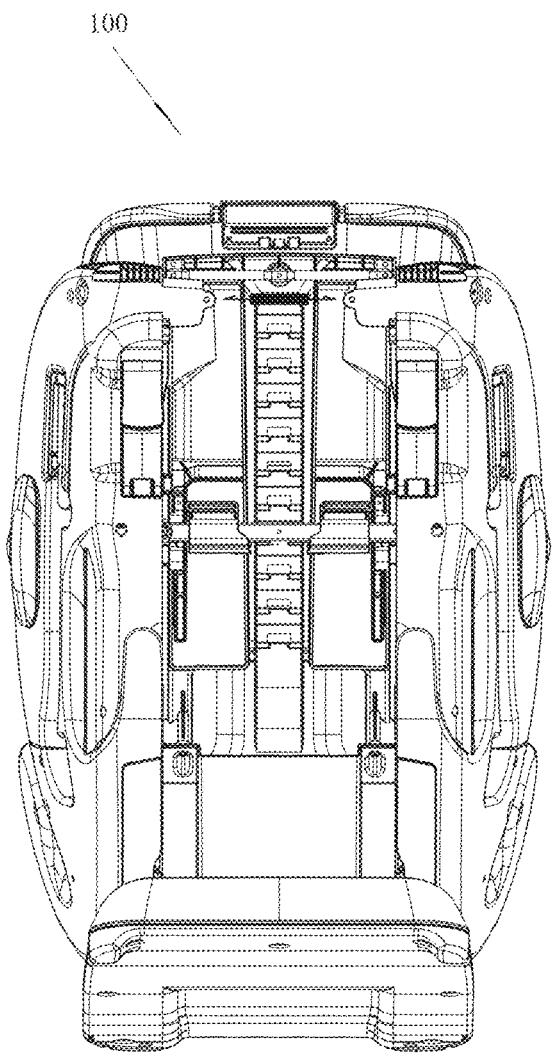
FIG. 3 is a rear view of the child safety seat according to the present disclosure, in which the child safety belt is not shown.
Figure 4:
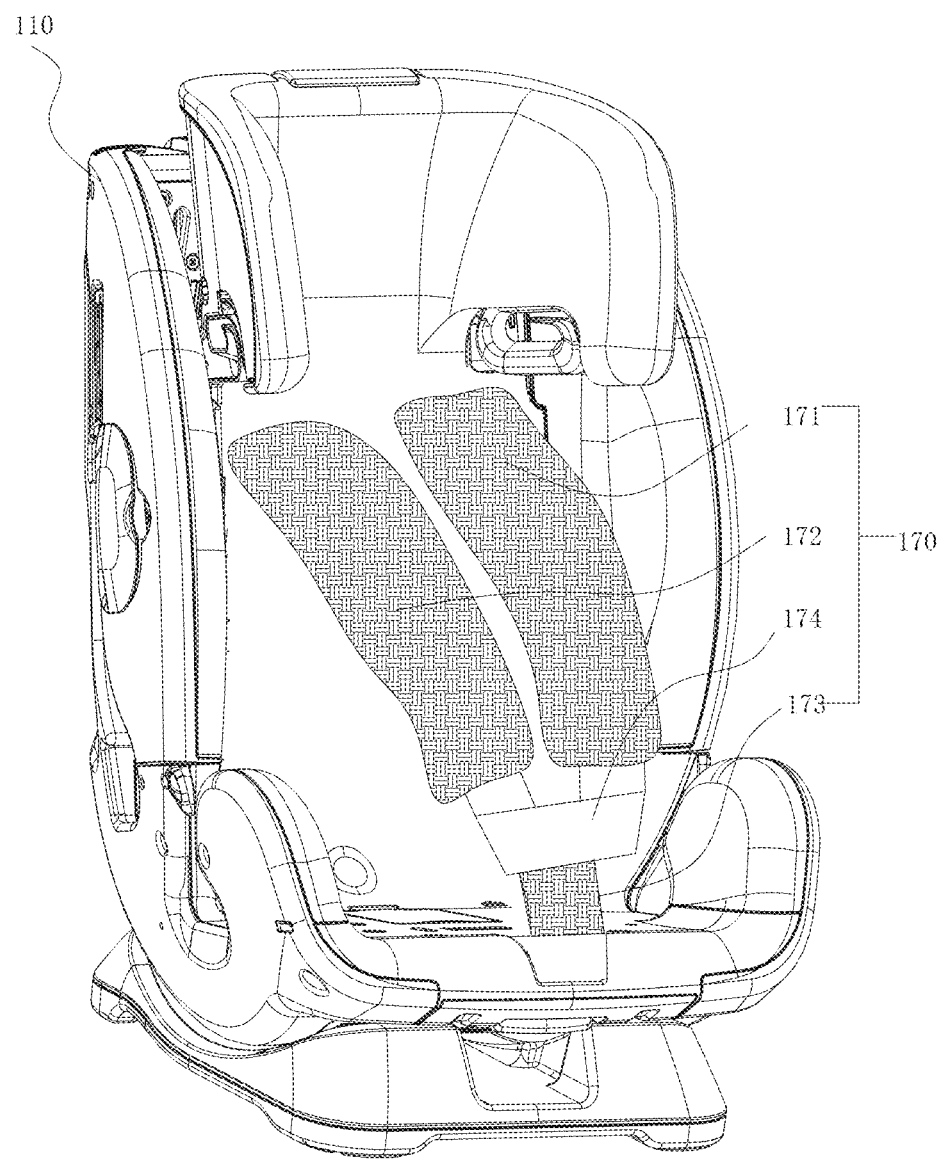
FIG. 4 is a perspective view of the child safety seat according to the present disclosure, in which the child safety belt is shown.
Figure 5:
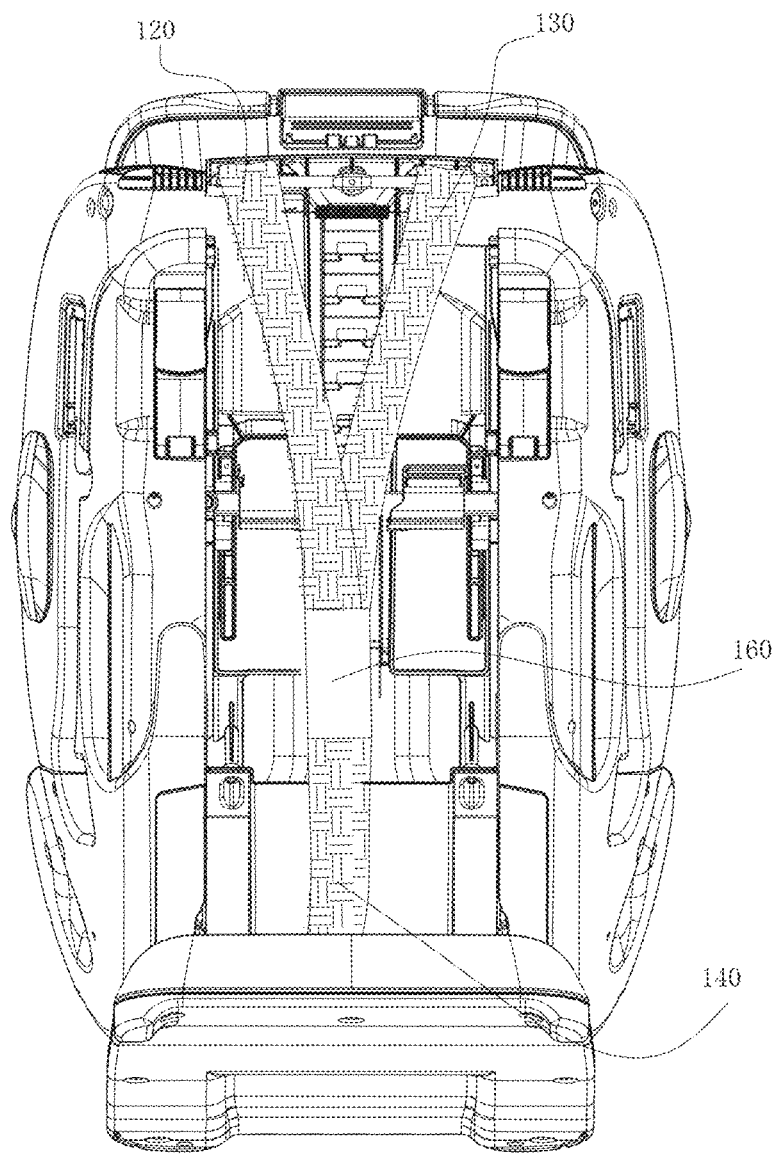
FIG. 5 is a rear view of the child safety seat according to the present disclosure, in which the child safety belt is shown.

Although the disclosure is illustrated and described herein with reference to specific embodiments, the disclosure should not be limited to the illustrated details. Specifically, various modifications may be made in these details within the scope of equivalents of the claims and without departing from the disclosure.

Directional expressions such as "front," "rear," "up," and "down" involved in this context are only used for the convenience of understanding, and the disclosure is not limited to these directions, but can be adjusted according to the actual situation.

A child safety seat according to the present disclosure will be described as a whole with reference to FIGS. 1-5. As shown, the child safety seat includes a seat body 110 on which a child can be seated. In order to secure the child in the seat body 110, a safety protective portion 170 is provided at the front of the seat body 110. In this embodiment, the safety protective portion 170 includes a first shoulder pad 171, a second shoulder pad 172, a crotch protector 173, and a connector 174 connected between the first shoulder pad 171, the second shoulder pad 172 and the crotch protector 173.

The first shoulder pad 171 and the second shoulder pad 172 are connected to a first shoulder belt 120 (FIG. 5) (i.e., a left shoulder belt) and a second shoulder belt 130 (FIG. 5) (i.e., a right shoulder belt) on the back of the seat body 110 through corresponding holes on the back of the seat body 110. Alternatively, the first shoulder belt 120 and the second shoulder belt 130 pass through corresponding holes on a backrest of the seat body 110, and extend from the rear of the seat to the front of the seat until it is connected to the connector 174, while the first shoulder pad 171 and the second shoulder pad 172 are attached to the first shoulder belt 120 and the second shoulder belt 130, respectively.

A lower end of the crotch protector 173 is connected to a front lower end of the seat body 110. The crotch protector 173 may be provided to have an adjustable length or non-adjustable length, and then connected to a lower end of the seat body 110 in the form of adjustable length or fixed connection.

Figure 11:
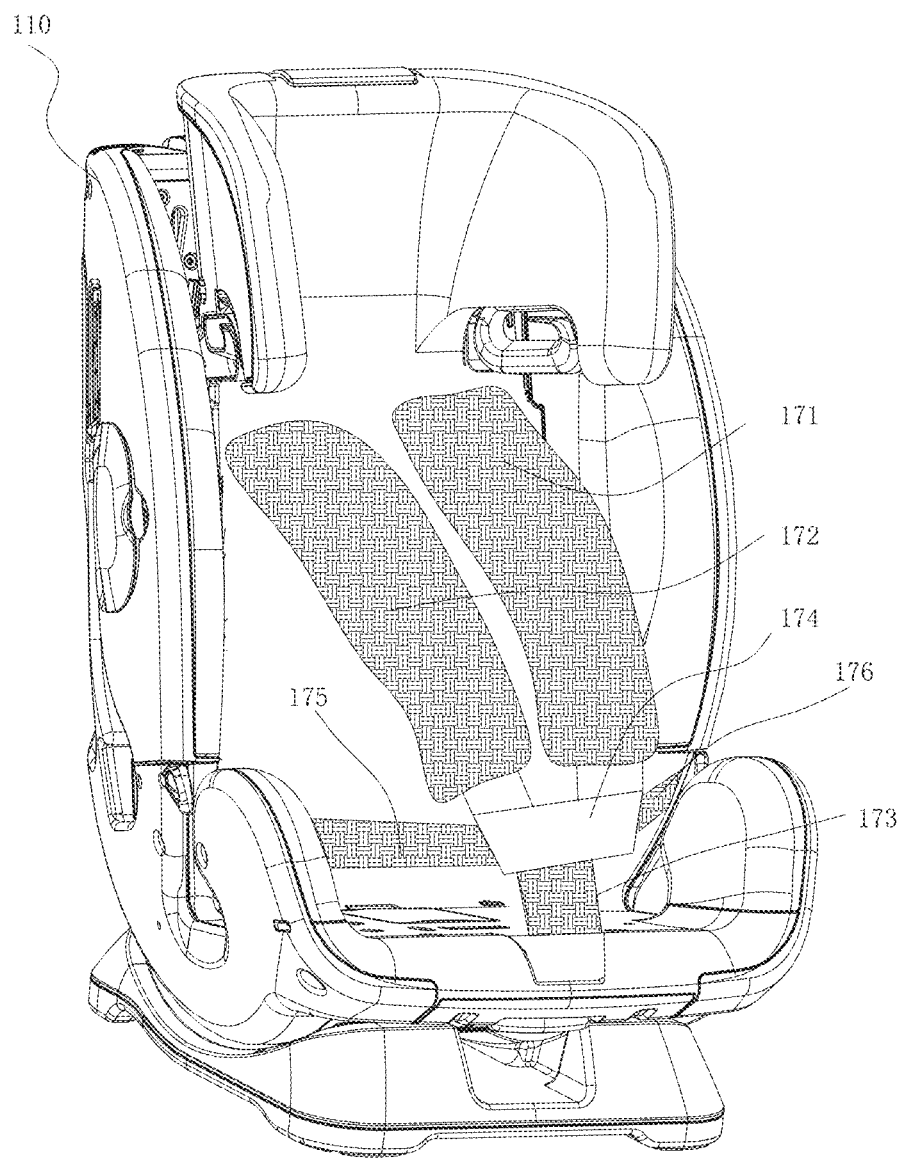
FIG. 11 shows a perspective view of the child safety seat according to the present disclosure, in which a structure of a waist belt is shown.

In an embodiment (see FIG. 11), the child safety seat is further provided with a waist belt, such as a first waist belt 175 and a second waist belt 176. An end of the first waist belt 175 and an end of the second waist belt 176 are respectively connected to left and right sides of the connector 174, and the other end of the first waist belt 175 and the other end of the second waist belt 176 are respectively connected to left and right sides of the seat body 110, so that the first waist belt 175, the second waist belt 176 and the connector 174 form a protective part laterally surrounding the waist of the child. In another embodiment, the first waist belt 175 and the second waist belt 176 may be extensions of the first shoulder belt 120 and the second shoulder belt 130, respectively, which pass through the connector 174 via lower ends of the first shoulder belt 120 and the second shoulder belt 130 and then are fixedly connected to the left and right sides of the seat body 110.

The connector 174 may be a buckle that allows the first shoulder pad 171, the second shoulder pad 172, and the crotch protector 173 to be connected with and separated from each other. In this way, after the child is seated on the seat, the first shoulder pad 171 and the second shoulder pad 172 are connected to the crotch protector 173, and an entire safety protective device is formed at the front of the seat body 110, thereby firmly securing the child.

A safety belt connecting structure is provided at the rear of the seat body 110, and includes a first shoulder belt 120, a second shoulder belt 130 and an adjusting belt 140.

The first shoulder belt 120 and the second shoulder belt 130 extend downward from the corresponding holes on the backrest and converge at a cross point. At this cross point, the adjusting belt 140 is connected to the first shoulder belt 120 and the second shoulder belt 130 and continues to extend downward to be connected to a lower part of the back of the seat body 110. To facilitate the adjustment of the seat belt, the adjusting belt 140 may also extend to the bottom of the seat body 110 via the back of the seat body 110, and finally pass through or bypass the bottom of the seat body 110 and extend out from the front of the seat body 110. The adjusting belt 140 is connected to the seat body 110 in a length-adjustable way, for example, by a connecting buckle, a pin-and-holed belt structure, a gear, a ratchet, or the like, to provide the function of changing the length of the adjusting belt 140, thereby adjusting the length of the whole safety belt connecting structure. Since the first shoulder belt 120 and the second shoulder belt 130 are connected to the first shoulder pad 171 and the second shoulder pad 172 after passing the backrest, changing the length of the adjusting belt 140 finally adjusts a tightening level of the safety protective portion 170 at the front of the seat body 110.

On the other hand, connections between the first shoulder belt 120, the second shoulder belt 130 and the adjusting belt 140 are fixed connections. In this way, after the length of the adjusting belt 140 is determined, it is basically not allowed to change the length of the entire safety belt connecting structure, and thus not allowed to change the tightening level of the safety protective portion 170. Therefore, in the event of collision, the child will be firmly tied to the child safety seat.

Referring to FIGS. 6A to 10B, the connection mode of the first shoulder belt 120, the second shoulder belt 130 and the adjusting belt 140 will be described. For easy understanding, an upper end of the first shoulder belt 120 (the end connected to the first shoulder pad 171) and an upper end of the second shoulder belt 130 (the end connected to the second shoulder pad 172) are respectively referred to as a first shoulder belt coupling end 124 and a second shoulder belt coupling end 134. A lower end of the first shoulder belt 120 (the end connected to the adjusting belt 140) and a lower end of the second shoulder belt 130 (the end connected to the adjusting belt 140) are respectively referred to as a first shoulder belt connecting end 121 and a second shoulder belt connecting end 131. An upper end of the adjusting belt 140 (the end connected to the first shoulder belt 120 and the second shoulder belt 130) is referred to as an adjusting belt connecting end 141, and a lower end of the adjusting belt 140 (the end connected to the seat body 110) is referred to as an adjusting belt adjusting end 144.

Figure 6A:
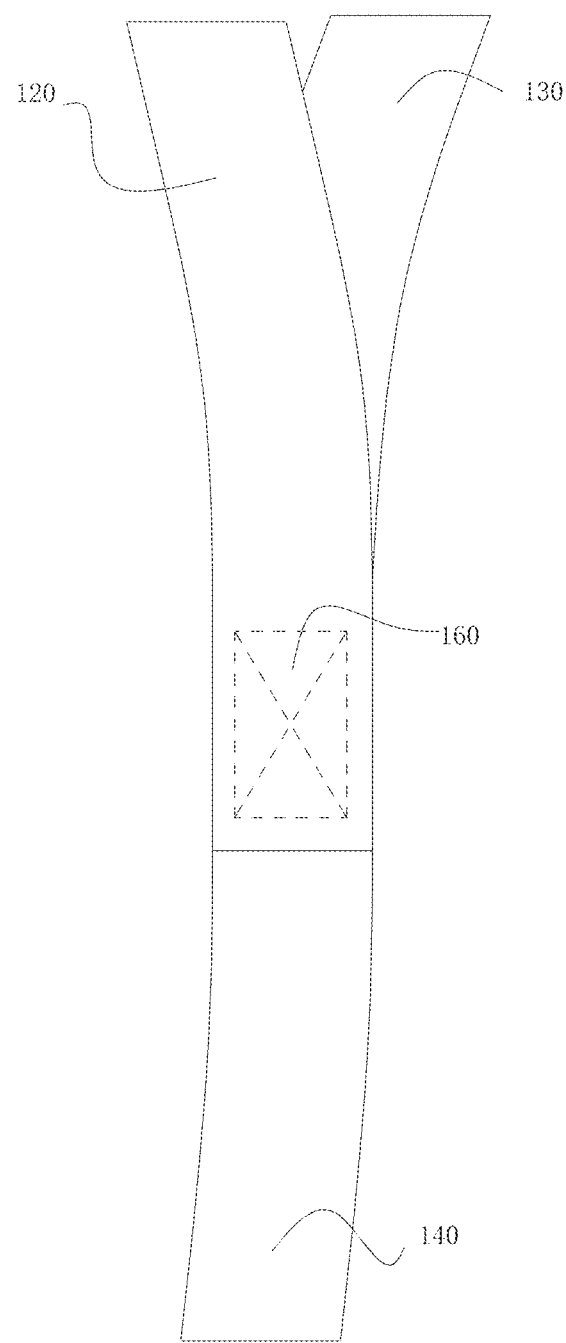
FIG. 6A shows a schematic front view of a first embodiment of a safety belt connecting structure according to the present disclosure.
Figure 6B:
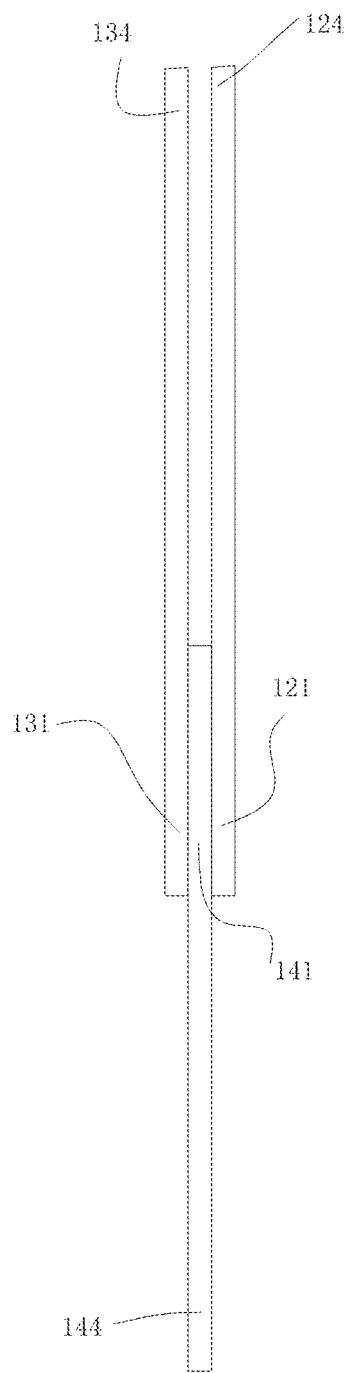
FIG. 6B is a schematic side view of FIG. 6A.

An embodiment of FIGS. 6A-6B will be described. As shown, the first shoulder belt 120 and the second shoulder belt 130 have approximately the same length. The adjusting belt connecting end 141, the first shoulder belt connecting end 121 and the second shoulder belt connecting end 131 are sewn together at a fixing area 160 where they intersect with each other. In an embodiment, an overlapping length of the sewn portion may be in the range of 15 mm to 100 mm. The first shoulder belt connecting end 121 and the second shoulder belt connecting end 131 and the adjusting belt connecting end 141 are generally arranged in a Y shape. In this embodiment, an extending direction of the first shoulder belt 120 and an extending direction of the second shoulder belt 130 at the fixing area 160 are the same, that is, each of the first shoulder belt 120 and the second shoulder belt 130 extend obliquely at its respective upper half, and then gradually transitions to vertically extend at its respective lower half. In an embodiment, the adjusting belt 140 is inserted between the first shoulder belt 120 and the second shoulder belt 130. However, in other embodiments, the stacking order of the adjusting belt 100, the first shoulder belt 120, and the second shoulder belt 130 may be arbitrarily changed.

In this embodiment, a suture in the fixing area 160 includes a rectangular frame suture and a diagonal suture. It should be understood that the suture as shown is only an example, and the suture may also be in various forms such as having multiple longitudinal sutures, multiple transverse sutures, or multiple oblique sutures. In other embodiments, the first shoulder belt 120, the second shoulder belt 130, and the adjusting belt 140 may be connected by rivet joint, clamping, snap-fit, or the like, instead of sewing.

Figure 7A:
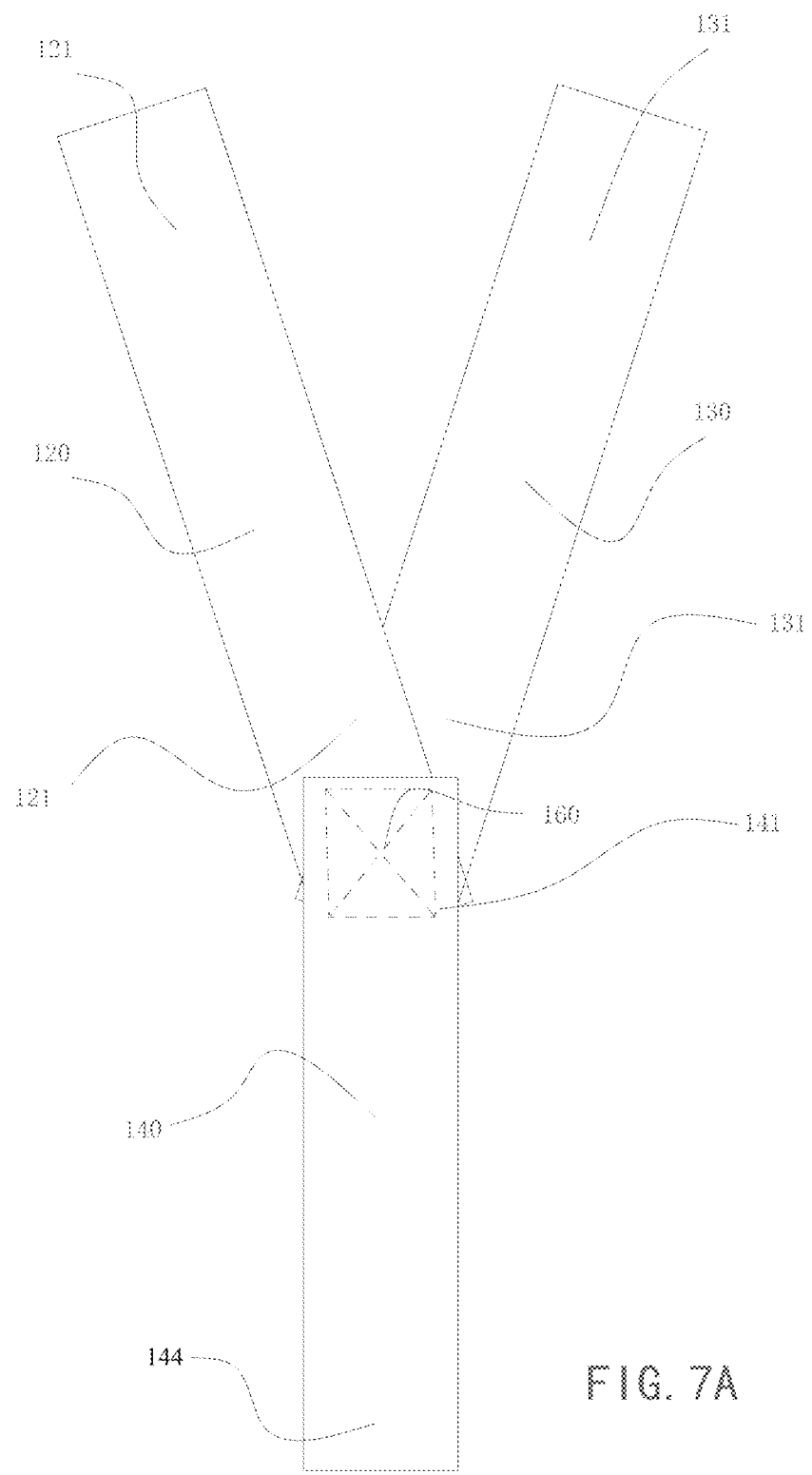
FIG. 7A shows a schematic front view of the second embodiment of the safety belt connecting structure according to the present disclosure.
Figure 7B:
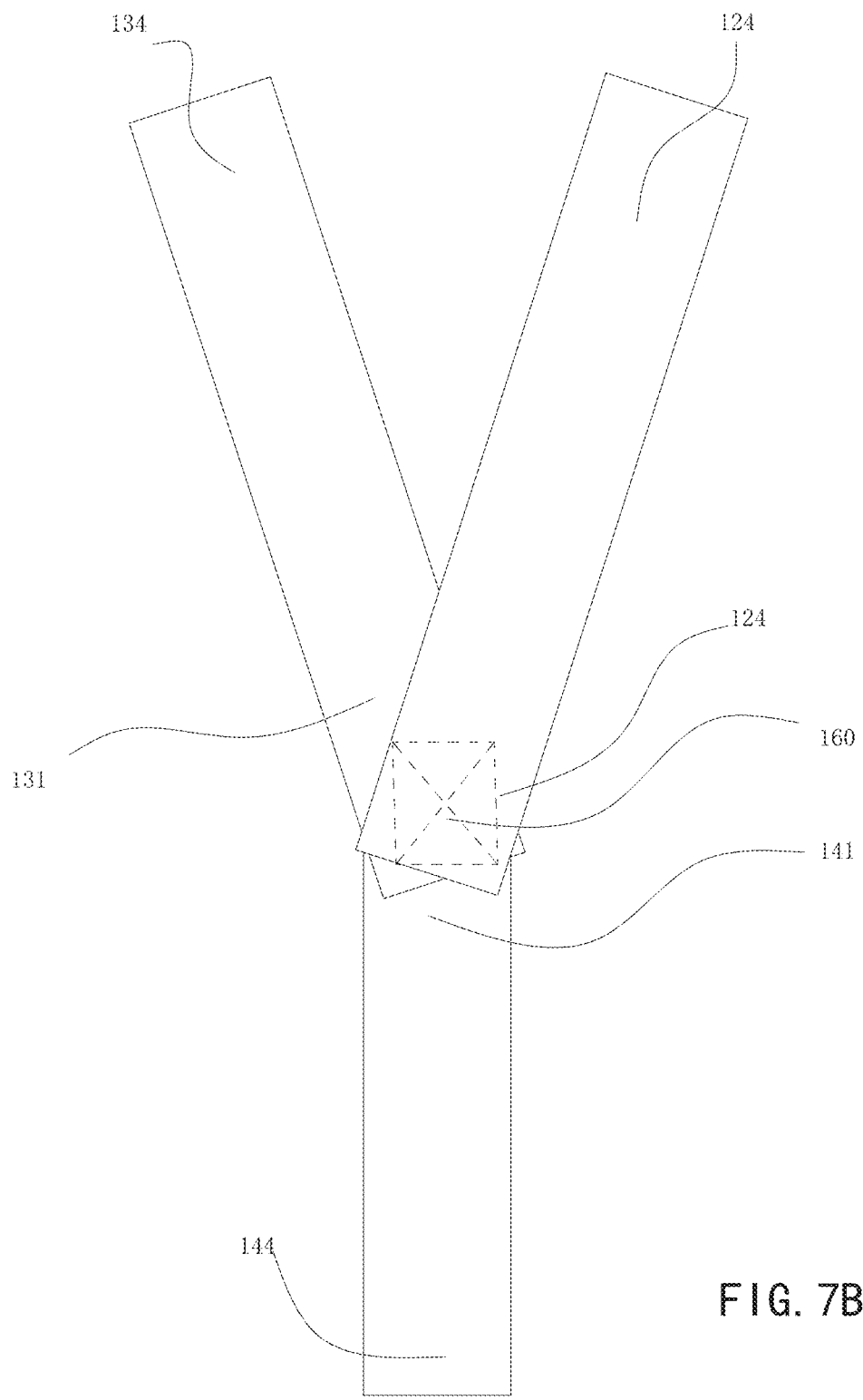
FIG. 7B is a schematic rear view of FIG. 7A.

An embodiment of FIGS. 7A-7B will be described. As shown, this embodiment is substantially the same as the embodiment of FIGS. 6A-6B, except that the first shoulder belt 120 and the second shoulder belt 130 in this embodiment are crossed at the fixing area 160. Furthermore, the adjusting belt 140 is placed above the first shoulder belt 120 (or above the second shoulder belt 130) instead of being interposed between the first shoulder belt 120 and the second shoulder belt 130. In other words, the adjusting belt connecting end 141 is stacked at a side of either of the first shoulder belt connecting end 121 and the second shoulder belt connecting end 131 which are attached to each other.

Figure 8A:
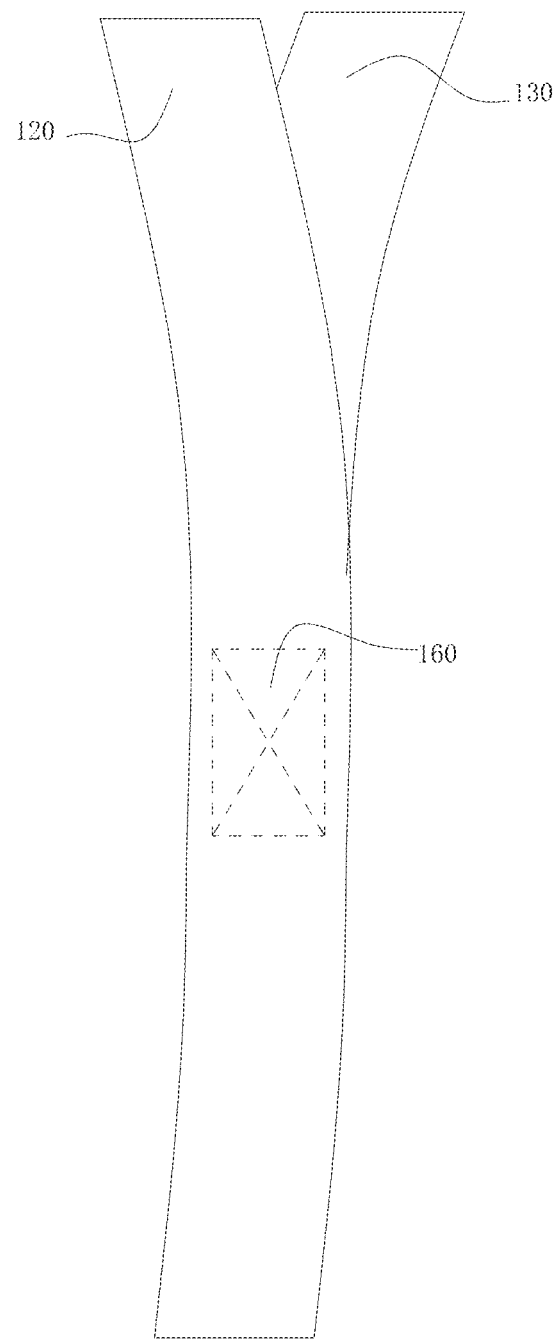
FIG. 8A shows a schematic front view of the third embodiment of the safety belt connecting structure according to the present disclosure.
Figure 8B:
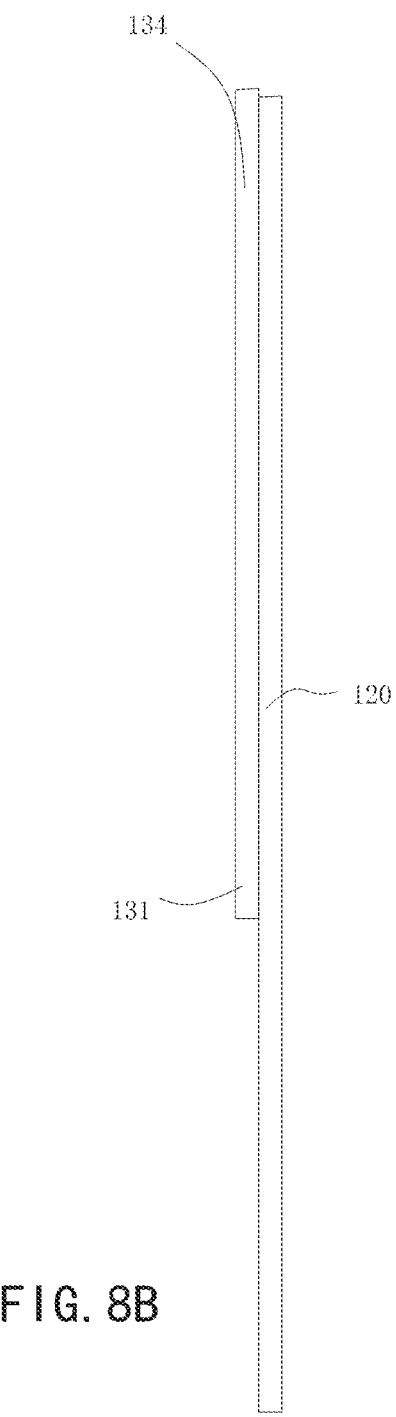
FIG. 8B is a schematic side view of FIG. 8A.

An embodiment of FIGS. 8A-8B will be described. As shown, the first shoulder belt 120 and the adjusting belt 140 are formed as a single belt, and the second shoulder belt 130 is connected to the single belt formed by the first shoulder belt 120 and the adjusting belt 140. The first shoulder belt connecting end 121 and the second shoulder belt connecting end 131 are connected together. In the present disclosure, the first shoulder belt 120 and the second shoulder belt 130 are interchangeable. Therefore, in another embodiment, the second shoulder belt 130 and the adjusting belt 140 may also be formed as a single belt, and the first shoulder belt 120 is connected to the single belt formed by the second shoulder belt 130 and the adjusting belt 140.

In the embodiments of FIGS. 9A-10B, the first shoulder belt 120 and the second shoulder belt 130 are formed as a single belt, so that it is convenient to set up the entire safety belt protective structure and increase the firmness of the entire safety belt protective structure.

Figure 9A:
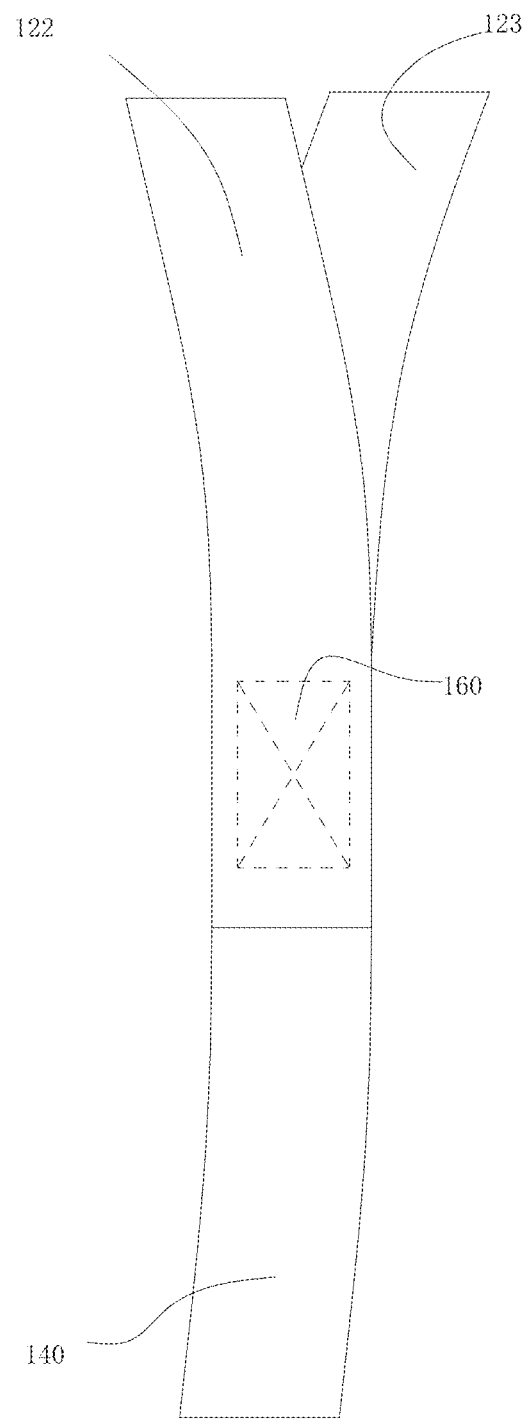
FIG. 9A shows a schematic front view of the fourth embodiment of the safety belt connecting structure according to the present disclosure.
Figure 9B:
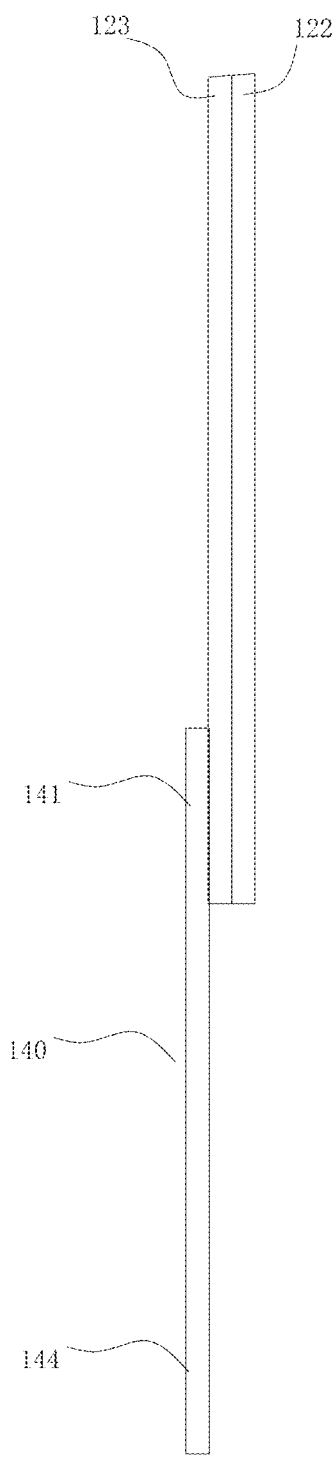
FIG. 9B is a schematic side view of FIG. 9A.

The embodiment of FIGS. 9A-9B will be described. As shown, the first shoulder belt 120 and the second shoulder belt 130 are composed of a single belt, and the adjusting belt connecting end 141 is connected at a middle part of the single belt formed by the first shoulder belt 120 and the second shoulder belt 130. The single belt is divided into a first half 122 corresponding to the first shoulder belt 120 and a second half 123 corresponding to the second shoulder belt 130 at the middle part of the belt. In this embodiment, extending directions of the first half 122 and the second half 123 at the fixing area 160 are the same, that is, each of the first half 122 and the second half 123 extend obliquely at its respective upper half, and then gradually transitions to vertically extend at its respective lower half.

In this way, since the first half 122 and the second half 123 extend in the same direction in the fixing area 160, and the adjusting belt 140 extends in a substantially opposite direction to the first half 122 and the second half 123 in the fixing area 160, when the safety belt connecting structure is pulled, the fixing area 160 is substantially only subjected to a vertical tension, but substantially no lateral tension, thus reducing the risk of the belt in the fixing area 160 being pulled apart.

Figure 10A:
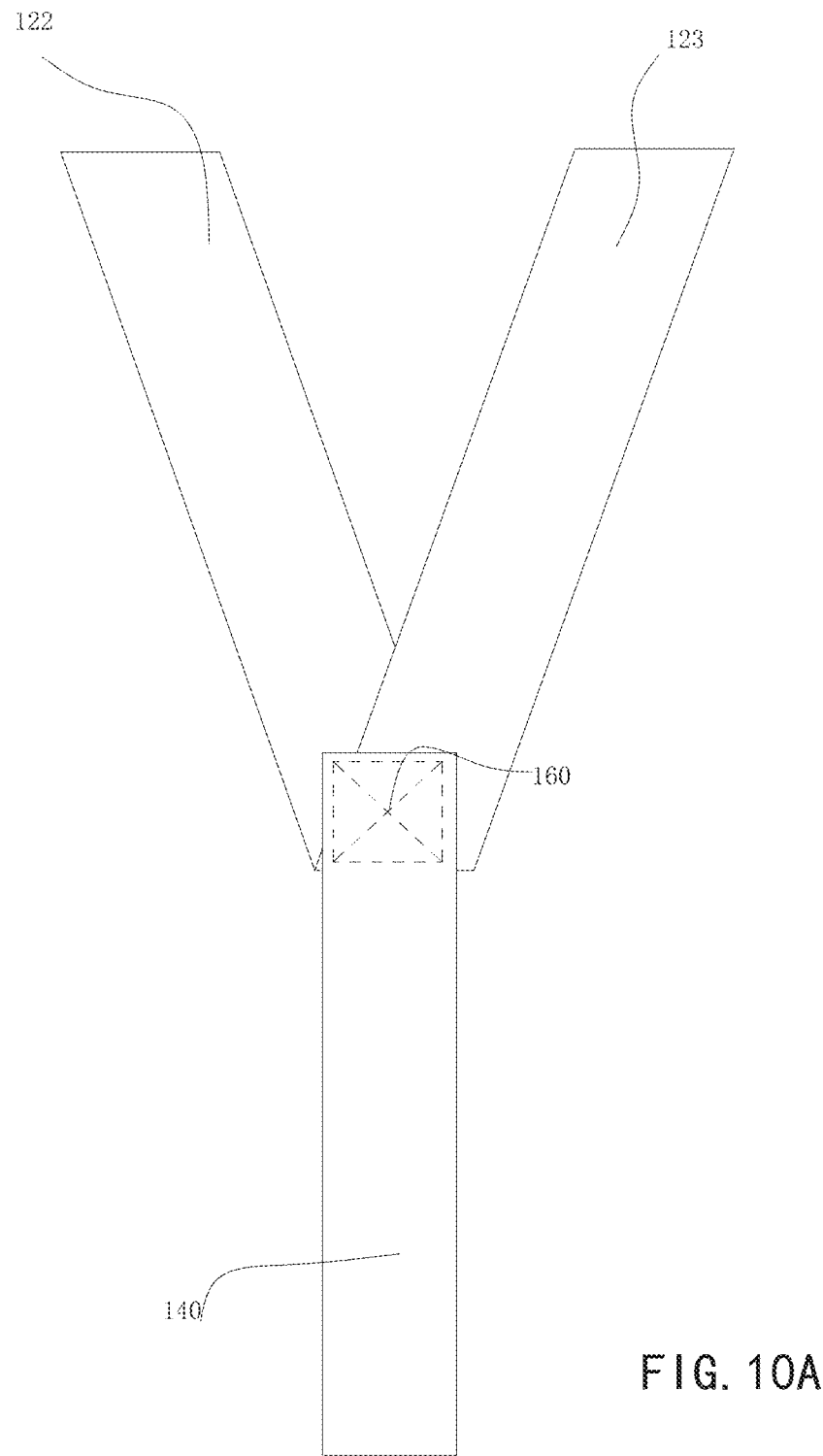
FIG. 10A shows a schematic front view of the fifth embodiment of the safety belt connecting structure according to the present disclosure.
Figure 10B:
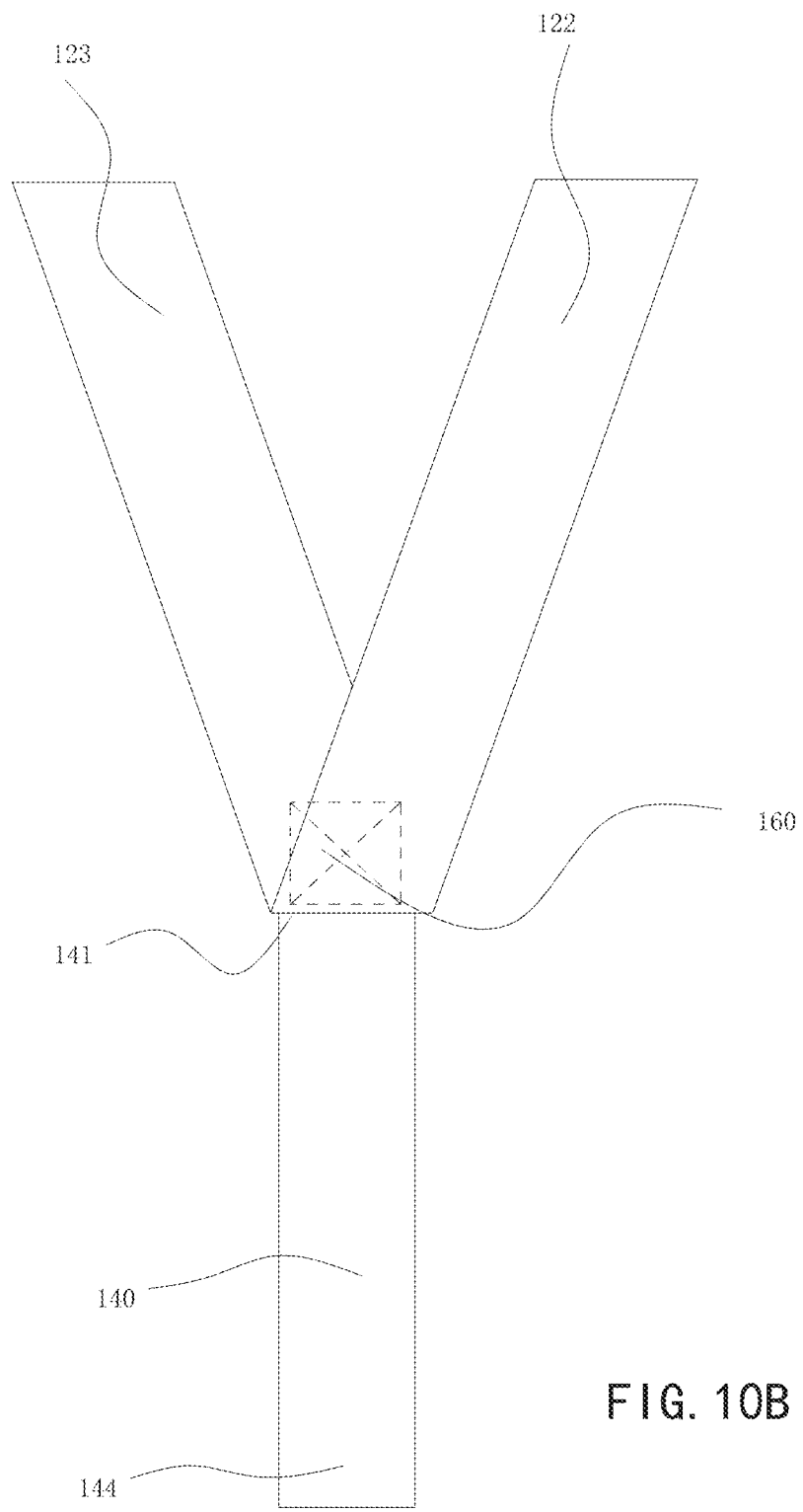
FIG. 10B is a schematic rear view of FIG. 10A.

An embodiment of FIGS. 10A-10B will now be described. This embodiment is substantially the same as the embodiment of FIGS. 9A-9B, except that the first half 122 and the second half 123 in this embodiment are crossed at the fixing area 160.

In this way, the first half 122 and the second half 123 extend in a substantially straight line at the back of the seat body 110, which is beneficial to the manufacturing and connecting process of the safety belt connecting structure.

With the above embodiments, the present disclosure provides a safety belt connecting structure providing an inextensible connection mode between the first shoulder belt 120, the second shoulder belt 130 and the adjusting belt 140.

The present disclosure has an advantage that the first shoulder belt 120 and the second shoulder belt 130 are not easily deformed and, in particular, will not be deformed due to the tightening of the safety protective portion 170, which will otherwise lead to the insufficient binding force for the child. On the other hand, the entire length of the safety belt cannot be easily changed and, in particular, when the safety protective portion 170 is tightened, a length change rate of the first shoulder belt 120, the second shoulder belt 130 and the adjusting belt 140 is smaller than 10%.

Although the disclosure has been provided with reference to typical embodiments, the terms used are illustrative and exemplary rather than restrictive. Since the disclosure can be implemented in various forms without departing from the spirit and essence of the disclosure, it should be understood, the above-mentioned embodiments are not limited to any of the foregoing details, but shall be interpreted in the broadest sense within the scope defined by the claims. Therefore, any variation falling within the scope of the claims or their equivalents shall be covered by the claims.

What is claimed is:
1. A safety belt connecting structure, comprising:
a first shoulder belt having a first shoulder belt coupling end and a first shoulder belt connecting end, the first shoulder belt coupling end being coupled to a front side of a facility where the safety belt connecting structure is to be installed;
a second shoulder belt having a second shoulder belt coupling end and a second shoulder belt connecting end, the second shoulder belt coupling end being coupled to the front side of the facility; and
an adjusting belt having an adjusting belt connecting end and an adjusting belt adjusting end, the adjusting belt connecting end being fixedly connected with the first shoulder belt connecting end and the second shoulder belt connecting end on a rear side of the facility, and the adjusting belt adjusting end being directly and adjustably fixed with a positioning portion on the facility, so that an acting length of the safety belt connecting structure with respect to the facility is adjustable by adjusting a position of the adjusting belt with respect to the positioning portion,
wherein
a length from the first shoulder belt coupling end or the second shoulder belt coupling end on the front side of the facility to the adjusting belt connecting end on the rear side of the facility is non-adjustable, and
two of the first shoulder belt, the second shoulder belt, and the adjusting belt are formed by a first single strip, and a remaining one of the first shoulder belt, the second shoulder belt, and the adjusting belt is formed by a second single strip, the first single strip and the second single strip being stacked with each other and fixed together.
2. The safety belt connecting structure according to claim 1, wherein:
the first shoulder belt has a length that is approximately equal to that of the second shoulder belt.

3. The safety belt connecting structure according to claim 2, wherein:
the adjusting belt connecting end, the first shoulder belt connecting end and the second shoulder belt connecting end are sewn together at a fixing area where they intersect with each other.

4. The safety belt connecting structure according to claim 2, wherein:
the first shoulder belt connecting end, the second shoulder belt connecting end and the adjusting belt connecting end are arranged in a substantially Y shape.

5. The safety belt connecting structure according to claim 1, wherein:
one of the first shoulder belt and the second shoulder belt is integrally formed together with the adjusting belt as the first single strip, and
the other of the first shoulder belt and the second shoulder belt is formed as the second single strip, a part of the first single strip corresponding to the first shoulder belt connecting end or the second shoulder belt connecting end and a part of the second single strip corresponding to the second shoulder belt connecting end or the first shoulder belt connecting end are fixedly connected with each other.

6. The safety belt connecting structure according to claim 1, wherein:
the first shoulder belt and the second shoulder belt are formed as the first single strip, the adjusting belt is formed by the second single strip, and
the adjusting belt connecting end and a middle part of the first single strip are fixedly connected with each other,
wherein the first single strip is divided into a first half corresponding to the first shoulder belt and a second half corresponding to the second shoulder belt by the middle part of the first single strip.

7. A child safety seat comprising:
a seat body;
a safety protective portion at front of the seat body and configured to secure a passenger on the child safety seat;
the safety belt connecting structure according to claim 1 is installed on a back of the seat body;
wherein a lower end of the safety protective portion is coupled to the seat body, an upper end of the safety protective portion is connected to the first shoulder belt coupling end and the second shoulder belt coupling end of the safety belt connecting structure through a corresponding hole on the back of the seat body, and the belt adjusting end of the safety belt connecting structure is coupled to the seat body.

8. The child safety seat according to claim 7, wherein:
the safety protective portion comprises a first shoulder pad, a second shoulder pad and a crotch protector; and
an upper end of the first shoulder pad and an upper end of the second shoulder pad are coupled to the first shoulder belt coupling end and the second shoulder belt coupling end of the safety belt connecting structure respectively, a lower end of the first shoulder pad and a lower end of the second shoulder pad are coupled to an upper end of the crotch protector through a connector respectively, and a lower end of the crotch protector is coupled to the seat body.

9. A safety belt connecting structure, comprising:
a first shoulder belt having a first shoulder belt coupling end and a first shoulder belt connecting end, the first shoulder belt coupling end being coupled to a front side of a facility where the safety belt connecting structure is to be installed;
a second shoulder belt having a second shoulder belt coupling end and a second shoulder belt connecting end, the second shoulder belt coupling end being coupled to the front side of the facility; and
an adjusting belt having an adjusting belt connecting end and an adjusting belt adjusting end, the adjusting belt connecting end being fixedly connected with the first shoulder belt connecting end and the second shoulder belt connecting end on a rear side of the facility, and the adjusting belt adjusting end being directly and adjustably fixed with a positioning portion on the facility, so that an acting length of the safety belt connecting structure with respect to the facility is adjustable by adjusting a position of the adjusting belt with respect to the positioning portion,
wherein
a length from the first shoulder belt coupling end or the second shoulder belt coupling end on the front side of the facility to the adjusting belt connecting end on the rear side of the facility is non-adjustable,
each of the first shoulder belt, the second shoulder belt, and the adjusting belt comprises an independent belt,
the first shoulder belt connecting end, the second shoulder belt connecting end, and the adjusting belt connecting end are stacked with each other and fixed to each other at a stacked position, and
each of the first shoulder belt and the second shoulder belt extends obliquely at its respective upper half, and then gradually transitions to vertically extend at its respective lower half, wherein the lower half of the first shoulder belt includes the first shoulder belt connecting end, and the lower half of the second shoulder belt includes the second shoulder belt connecting end.

10. The safety belt connecting structure according to claim 9, wherein:
the adjusting belt connecting end is stacked between the first shoulder belt connecting end and the second shoulder belt connecting end.

11. The safety belt connecting structure according to claim 9, wherein:
the first shoulder belt connecting end and the second shoulder belt connecting end are attached to each other, and
the adjusting belt connecting end is stacked at a side of either of the first shoulder belt connecting end and the second shoulder belt connecting end that are attached to each other.

12. The safety belt connecting structure according to claim 9, wherein:
the first shoulder belt connecting end, the second shoulder belt connecting end, and the adjusting belt connecting end are sewn to each other in a manner that (i) the first shoulder belt connecting end, the second shoulder belt connecting end, and the adjusting belt connecting end are stacked with each other and (ii) lateral edges of the first shoulder belt connecting end, lateral edges of the second shoulder belt connecting end, and lateral edges of the adjusting belt connecting end coincide with each other.

13. The safety belt connecting structure according to claim 1, wherein:
the first single strip is divided into a first half corresponding to the first shoulder belt and a second half corresponding to the second shoulder belt, the first half has an upper half extending in a first direction, and a lower half continuously extending from the upper half in a second direction different from the first direction, and the second half has an upper half extending in a third direction different from the first direction, and a lower half continuously extending from the upper half of the second half in the second direction different from the third direction.

14. The safety belt connecting structure according to claim 13, wherein:

the first half extends obliquely in the first direction at the corresponding upper half, and then gradually transitions to vertically extend in the second direction at the corresponding lower half, and the second half extends obliquely in the third direction at the corresponding upper half, and then gradually transitions to vertically extend in the second direction at the corresponding lower half.

15. The safety belt connecting structure according to claim 14, wherein:

the second single strip corresponding to the adjusting belt, the lower half of the first half, and the lower half of the second half are fixed together at a fixing area.

16. The safety belt connecting structure according to claim 15, wherein:

the fixing area is configured to be substantially subjected to a vertical tension without a lateral tension to reduce a risk of the first single strip and the second single strip at the fixing area being pulled apart.

17. The safety belt connecting structure according to claim 1, wherein:

the first shoulder belt and the adjusting belt are formed by the first single strip, and the second shoulder belt is formed by the second single strip.

* * * * *